(No Model.)
R. L. HARRIS.
ELECTRIC SUBWAY.
No. 344,962. Patented July 6, 1886.
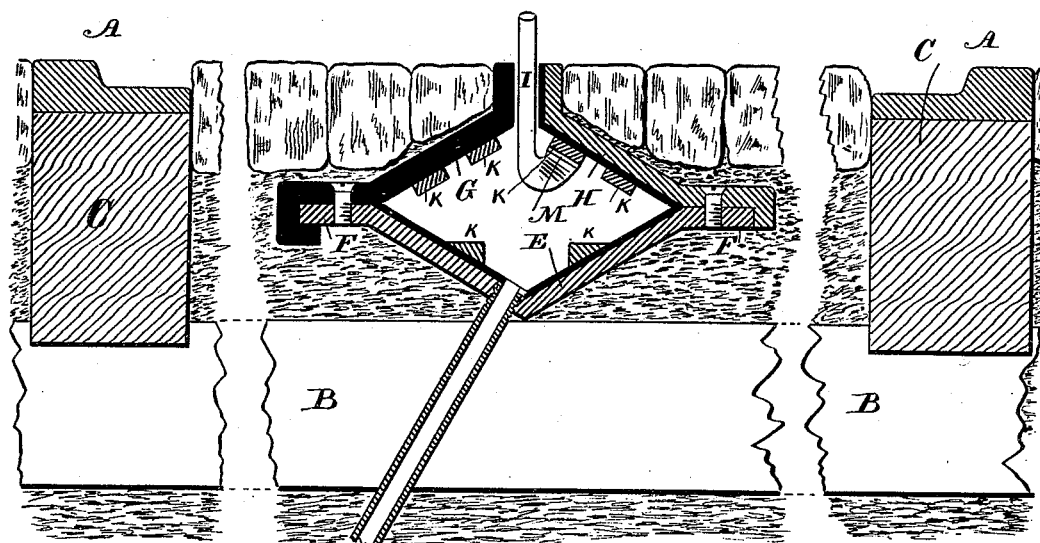
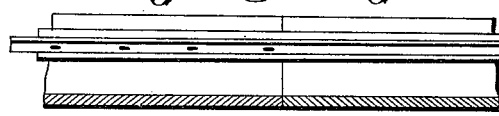
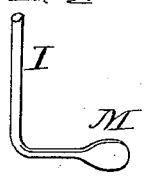
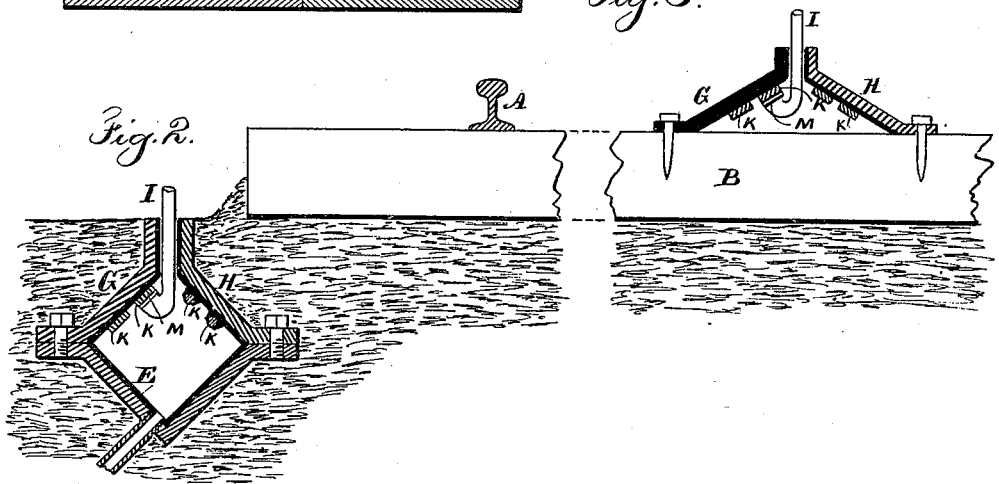
Witnesses
Chas H. Smith
J. Stait
Inventor
Robert L. Harris
per Lemuel W. Serrell
atty

UNITED STATES PATENT OFFICE.

ROBERT L. HARRIS, OF BROOKLYN, NEW YORK.

ELECTRIC SUBWAY.

SPECIFICATION forming part of Letters Patent No. 344,962, dated July 6, 1886.

Application filed December 26, 1885. Serial No. 186,665. (No model.)

*To all whom it may concern:*

Be it known that I, ROBERT L. HARRIS, of Brooklyn, in the county of Kings and State of New York, have invented an Improvement in Electric Subways, of which the following is a specification.

Before my invention cars had been propelled by an electric motor, to which the electricity was supplied by conductors placed within longitudinally-slotted tubes, and with which a pendent arm and contact spring or wheel conveyed the current to the electric motor placed upon the car. In these cases difficulty has been experienced in obtaining access to the electric conductor for repairs, and no provision was made for introducing other conductors as the necessities of the railway might demand from time to time.

In electric railways it is desirable to have conductors insulated and so placed as to be protected from rain, snow, water, dirt, &c. The electrical supply to the motors should be continuous; consequently there should be more than one conductor in case of accident. It is also sometimes useful to have one conductor for a positive current and one for a negative. Moreover, it is desirable on a busy road that there should be special conductors for each of several sets of motors, so that several distinct currents can be utilized at once, as well as several motors using either current, and thus, with practically the same appliances, not only vary car accommodations with the varying business hours of the day, but also save generating electricity for certain conductors during slack periods of the day.

It is important that the conduit should be so constructed that the conductors can be easily repaired, and so as to readily admit the placing of new conductors as the demands of travel may increase, and that it should be readily drained. With these objects in view I make or line my conduit with materials of low electrical conductivity or insulating material, so that two or more lines of electrical conductors can be attached directly to the inner surfaces of the conduit, and such conductors can be numerous and of any desired size or shape. I may, at times, make use of strips of hard rubber, vulcanized fiber, or similar material for partially surrounding and thereby grasping and holding the electrical conductors, as shown, with the round conductors, Figure 2, and thus insulate the conductors, instead of the surface to which they are attached being of insulating material.

I make my conduit or subway with removable upper sections, and prefer to attach the conductors to the alternate sections longitudinally, so that a removable section without the conductors attached thereto comes opposite to a section where the conductors are attached. In this way easy access is given for repairs, for the sections to which the conductors are attached need not be moved, and for the same reason conductors can be added from time to time, as the permanent business of the road may require. My conduit can be stayed or connected by braces to the stringers or side rails.

In the drawings, Fig. 1 is a cross-section of my subway or conduit in a form adapted to city railways. Figs. 2 and 3 are similar views of forms adapted to ordinary railway-lines. Fig. 4 is a partial longitudinal section of two adjacent sections of conductors, showing the conductor attached to one section but not to the next; and Fig. 5 is a side view of a contact-maker that may be made use of.

Let A represent the rails or track, and B the cross-ties. In city railways stringers C usually carry the rails, so that pavement can be laid between them. For railways of this character my conduit or subway is made sufficiently shallow to pass over the cross-ties and not project above the pavement, as seen in Fig. 1. With ordinary lines of ballasted railway the conduit can rest upon the ties, as shown in Fig. 3, in which case no bottom section is needed; but it is preferable to bury the conduit outside the ends of the cross-ties and have it similar to what is shown in Fig. 2, and to make the subway deeper than is shown in Fig. 1. The subway is composed of or lined with insulating material, and is made in sections. The bottom section, E, is trough-shaped, and is provided with flanges F at the upper edges, and there are holes or openings at intervals in the bottom of the trough for the escape of water, which, in the case of city railways, is thence conducted by pipes promptly to the sewers. In tracks where the conduit is below the surface, as in Figs. 1 and 2, the removable sections G and H of the conduit rest at their lower edges upon and are secured to the flanges of the lower section, E, preferably by bolts passing through the flanges, and these sections G H are fastened to the ties in Fig. 3. There is a space left between the top edges of the sections G H, forming a longitudinal slot, through which an arm or bar, I, from the motor passes, and this arm may carry one or more insulated conductors between the yielding contact-maker M at the lower end of the arm and the electric motor; or it may itself form the conductor. This contact-maker, when at the end of a horizontal yielding arm, as seen in Fig. 5, can be brought into contact with either of the conductors by raising or lowering the rod I and by turning such rod more or less to swing the contact-maker into the proper position to be in line with the conductor. I employ two or more electric conductors, K K, which are secured to the interior surface of the conduit, (usually to the alternate upper sections, as previously stated.)

The contact-maker M is arranged so that it may be brought into connection with the conductor for which it is especially fitted. In case of accident to the current on that conductor, there need be no material stoppage of transportation, as the contact-maker M itself may be promptly changed, or it may be brought or swung into connection with another of the conductors. A principal object accomplished, however, is to provide in the one conduit separate conductors for separate sets of motors, the contact-makers of the sets being arranged for the positions and shapes of the various conductors, so that each set of motors has its special conductor; but the contact-makers can be changed from one conductor to another in case of necessity.

I claim as my invention—

1. The combination, with two or more longitudinal electric conductors, of a hollow metallic conduit having a longitudinal slot in the upper part, and the interior thereof, including the faces of the slots, covered with an insulating material, and upon which insulating material the conductors are affixed, substantially as specified.

2. The conduit having the inner surface of its sections of insulating material, in combination with two or more electric conductors attached to such insulating material upon alternate sections, so that those sections that the conductors are not attached to can be removed for repairing or adding conductors without disturbing the attachments of the conductors to the other sections, substantially as set forth.

3. The combination, with the lower section, E, having flanges at its upper edges, of the removable sections G and H, secured to the section E, and having a longitudinal slot or opening between their upper edges, and an arm passing through such longitudinal opening, and a contact-maker at the lower end of such arm, and two or more insulated conductors attached to the interior surfaces of the sections, substantially as set forth.

Signed by me this 23d day of December, A. D. 1885.

ROBERT L. HARRIS.

Witnesses:
HAROLD SERRELL,
WILLIAM G. MOTT.